Patented Aug. 6, 1929.

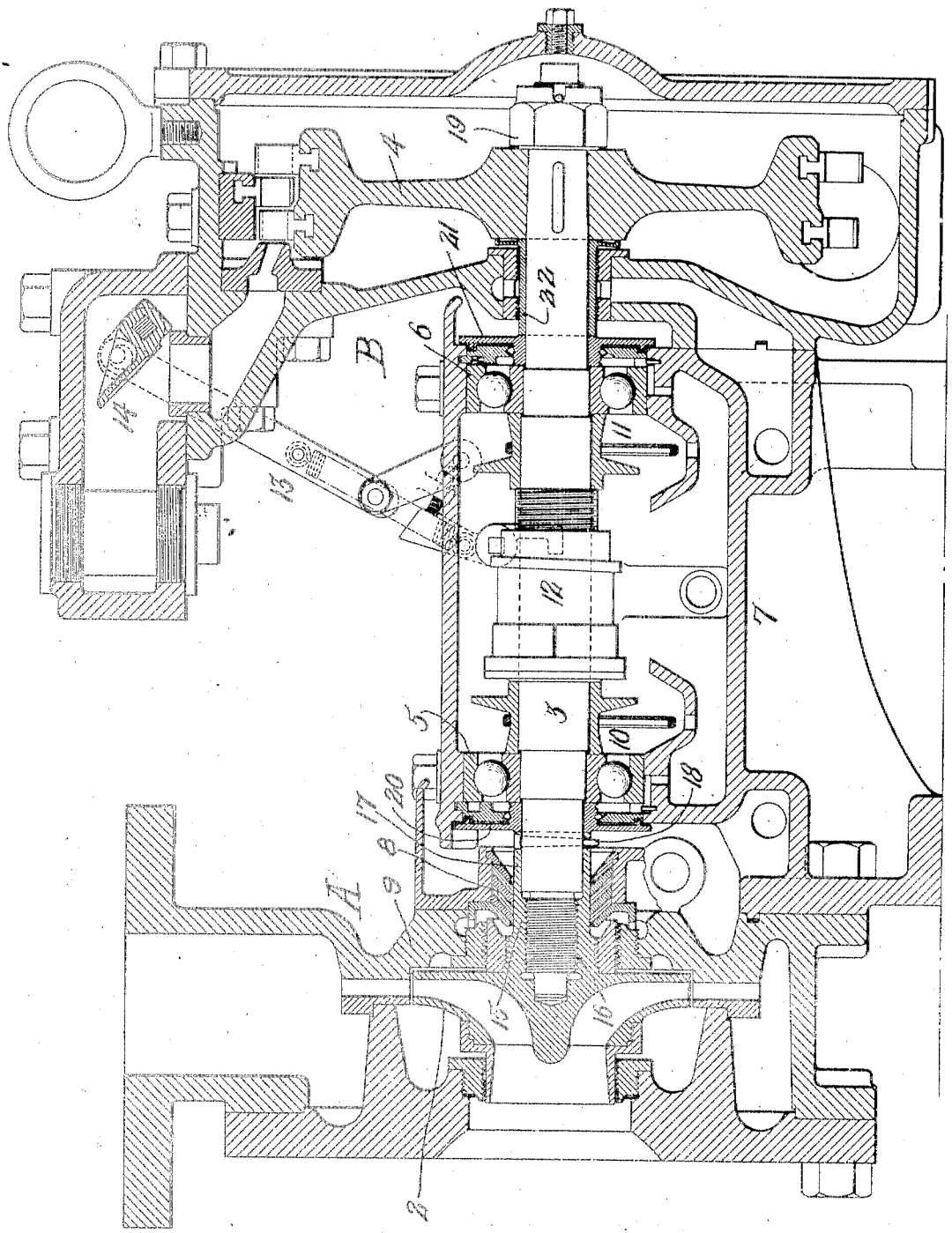

1,723,661

UNITED STATES PATENT OFFICE.

CHRISTOPHER A. SCHELLENS, OF MARBLEHEAD, MASSACHUSETTS, ASSIGNOR TO C-S ENGINEERING COMPANY, OF JERSEY CITY, NEW JERSEY, A CORPORATION OF DELAWARE.

PUMP UNIT.

Application filed January 20, 1927. Serial No. 162,244.

This invention relates to improvements in pump units, and particularly to high speed turbine driven centrifugal pump units for supplying feed water to locomotive boilers.

The primary object of the invention is to simplify the construction of such pump units.

More specifically it is an object of the invention to provide a construction whereby a single clamping means carried by the shaft of the unit serves to position and clamp rigidly to the shaft both the pump impeller and the turbine wheel, and, in addition, the various bearing, packing and other devices associated with the shaft.

How the foregoing, together with such other objects and advantages as will hereinafter appear, or are incident to my invention, are realized is illustrated in preferred form in the accompanying drawing, wherein—

The figure is a section through a pump unit constructed in accordance with my invention.

The reference letter A denotes a centrifugal pump and the letter B a single pressure stage high speed turbine motor for driving the pump.

The pump impeller or runner 2 has an axial intake and a radial discharge from its periphery and is carried on one end of the drive shaft 3, and the turbine wheel 4 is carried at the other end of the shaft. Spaced bearings 5 and 6 for the drive shaft are mounted in the supporting structure 7, one being adjacent the pump impeller and the other adjacent the turbine wheel. Suitable packing means 8 carried by the pump casing 9 and located between the impeller 2 and the bearing 5 is provided for preventing leakage around the shaft.

It will be noted that the bearings 5 and 6 are spaced well apart so that a very substantial support is afforded for the shaft. By this arrangement I am enabled to advantageously mount certain parts, such as the oil ring devices 10 and 11 and the governor device 12 on the shaft between the bearings and to provide a lubricant reservoir common to the devices 10 and 11 whereby lubricant may be effectively supplied to the parts between the bearings and to the bearings.

The governor device 12 per se is not claimed in this application, and it will, therefore, suffice to say that it is a device operating, when the speed of the turbine reaches a predetermined point, to trip the emergency trip device 13. When such action takes place, the valve device 14 operates to close the turbine valve, and the turbine immediately slows down, thus avoiding overspeeding of the unit.

Referring now to the manner of securing the impeller 2 to the drive shaft, it will be seen that the impeller is provided with a hub 15 on the face opposite its intake, which hub has an internal screw threaded portion 16 and a sleeve-like portion 17 into which the end of the drive shaft is screw threaded. A tapered dowel 18 passing through the sleeve portion 17 of the impeller hub and the drive shaft is provided for preventing the impeller from turning on the screw threads. This dowel is so proportioned and the tapered hole in the shaft is so drilled that the center of gravity of the dowel falls past the axial center line of the shaft, by virtue of which the dowel will be held firmly in place due to the effect of centrifugal force thereon. The importance of such a construction will be understood when the high speed at which the pump runs is considered, the speed being preferably in the neighborhood of 8000 R. P. M's.

The turbine wheel 4 is keyed onto the end of the shaft opposite the impeller end, and is also a driving fit thereon; the shaft having a tapered end and the impeller having a correspondingly tapered bore for this purpose. In addition to this, a castellated clamp nut 19 is provided to further insure against the turbine wheel working loose.

By means of the nut 19 the impeller 2, the turbine wheel 4, the inner race of the bearings 5 and 6, the bearing cover plates 20 and 21, the oil ring devices 10 and 11, the governor device 12, and the sleeve 22 are positioned on the shaft and clamped, the parts just mentioned being arranged to abut one another for this purpose. In other words, when the nut 19 is tightened up, then all of the parts are brought into abutment with one another with the last bearing cover plate 20 in abutment with the hub of the impeller. Thus, it will be seen that I have provided a simple and novel shaft assembly whereby a single clamping means carried by the shaft serves to clamp rigidly to the shaft, both the impeller and the turbine wheel, and, in addition, the various bearing, oiling, and trip devices associated with the shaft.

I claim:—

1. A turbine driven centrifugal pump unit comprising a drive shaft, an impeller carried by one end of said shaft, a turbine wheel carried by the other end of said shaft, spaced bearings carried by said shaft between said impeller and turbine wheel, and means located at one end of said shaft arranged to position and clamp fixedly thereto, said impeller and turbine wheel and essential elements of said spaced bearings.

2. A turbine driven centrifugal pump unit comprising a drive shaft, an impeller carried by one end of said shaft, a turbine wheel carried by the other end of said shaft, spaced bearings carried by said shaft between said impeller and turbine wheel, an emergency trip device carried by said shaft between said bearings, and means located at one end of said shaft arranged to clamp fixedly thereto said impeller and turbine wheel and emergency trip device.

3. A turbine driven centrifugal pump unit comprising a drive shaft having its end portions screw threaded, an impeller threaded onto one end of the shaft, a nut threaded onto the other end of the shaft, a turbine wheel, and a plurality of other parts carried by the shaft, said nut when tightened serving to position and clamp said wheel and parts between it and the impeller for rotation with the shaft.

4. A turbine driven centrifugal pump unit comprising in combination a drive shaft having means at one end for securing a pump impeller thereto, an adjustable positioning or clamping device at the other end, said impeller, a turbine wheel, and a plurality of other parts carried by the shaft, said device when tightened serving to position and clamp said wheel and said parts between it and the impeller for rotation with the shaft.

5. In a centrifugal pump, the combination of a drive shaft having a screw thread at an end thereof, an impeller adapted to be screw threaded thereon, and a tapered dowel for preventing the impeller from rotating with respect to the shaft, said dowel being so proportioned with reference to its hole that when in position its center of gravity falls past the axial center of the drive shaft.

In testimony whereof I have hereunto signed my name.

CHRISTOPHER A. SCHELLENS.